United States Patent

Heob et al.

[15] 3,644,066
[45] Feb. 22, 1972

[54] FAN

[72] Inventors: Norvel J. Heob, Sturtevant; Jon D. Stoor, Kansasville, both of Wis.

[73] Assignee: MSL Industries, Inc.

[22] Filed: Oct. 13, 1969

[21] Appl. No.: 865,725

[52] U.S. Cl. ............................ 417/354, 417/423, 339/220, 310/90, 29/156.8, 29/630
[51] Int. Cl. ............... F04b 35/04, H02k 5/16, B23p 15/02, B23p 15/04
[58] Field of Search .................... 417/353, 423, 354; 310/90

[56] References Cited

UNITED STATES PATENTS

| | | | |
|---|---|---|---|
| 2,904,709 | 9/1959 | Lautner | 310/90 |
| 2,926,838 | 3/1960 | Van Rijn | 310/67 X |
| 3,365,123 | 1/1968 | Seabury | 417/423 X |
| 3,513,339 | 5/1970 | Harris et al. | 310/90 |

Primary Examiner—Carlton R. Croyle
Assistant Examiner—R. E. Gluck
Attorney—Dressler, Goldsmith, Clement & Gordon

[57] ABSTRACT

A ventilating fan in which a hub carrying a fan blade is affixed to a rotor which is rotatable about a fixed shaft. A stator assembly surrounding the rotor is fastened to a motor receiving member and has stator windings which are partially embedded in epoxy resin. The hub covers the rotor and stator assembly and serves as an oil seal for the rotor assembly.

A terminal block is provided having a pair of terminals which are twisted at one end with respect to their respective slots in an insulative member, to prevent longitudinal movement of the terminals in the direction of the other end.

12 Claims, 11 Drawing Figures

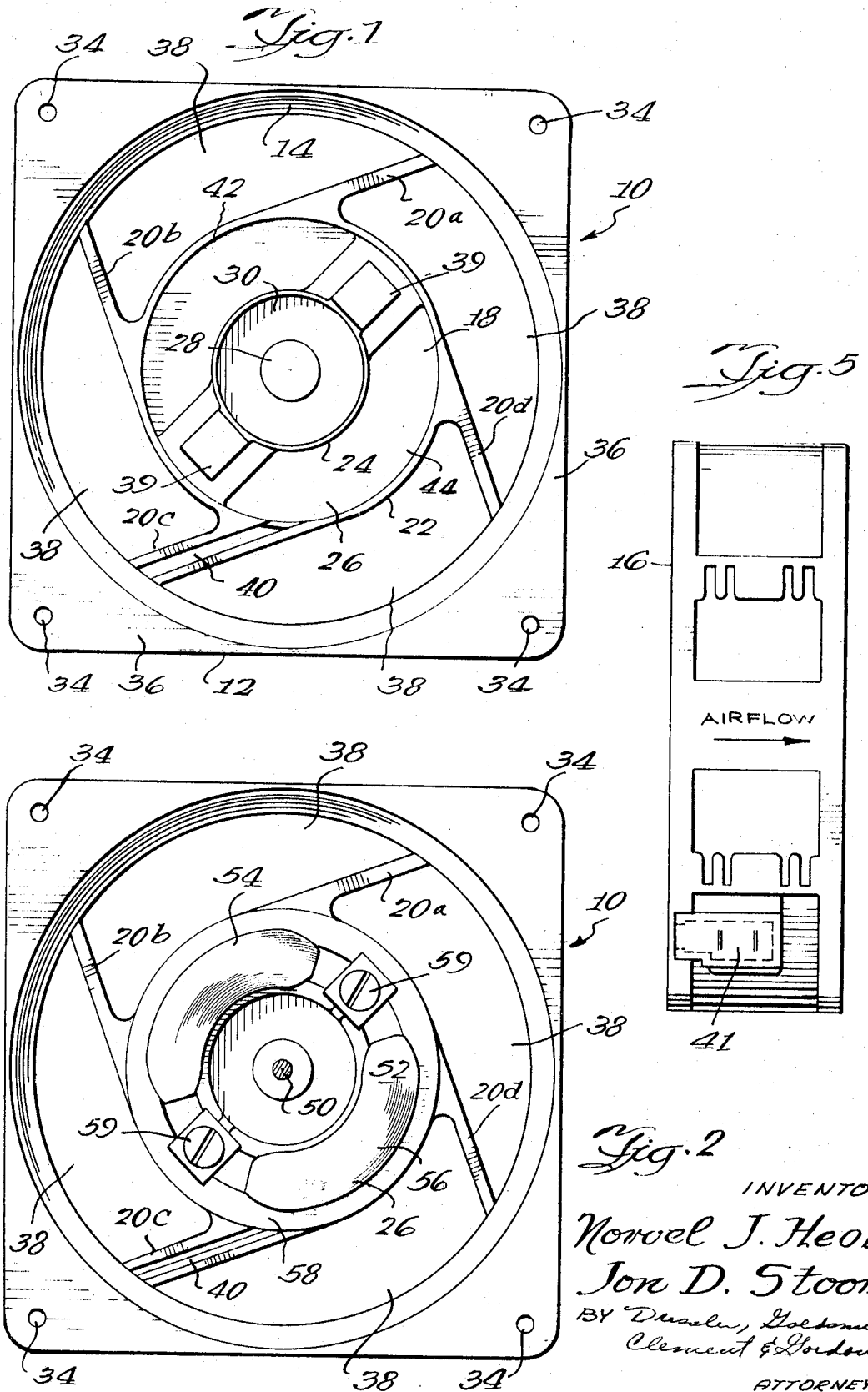

INVENTORS
Norvel J. Heob
Jon D. Stoor
BY Dressler, Goldsmith, Clement & Gordon
ATTORNEYS

FAN

BACKGROUND OF THE INVENTION

This invention relates to a ventilating fan which is particularly suitable for cooling electronic equipment.

Much electronic equipment in use today is designed so that small ventilating fans, commonly known as "box fans" can be mounted within the assembly and used to move the heat away from the electronic components. It is important that such ventilating fans be compact, relatively quiet, lightweight, relatively maintenance free and easy to service.

Although there are a number of box fans on the market, such prior art fans have certain disadvantages. For example, prior art box fans require periodic lubrication. Further, construction and repair is complicated because the fan blades of prior art box fans are difficult to remove from the units.

Some prior art fans are noisy and their method of manufacture is inefficient. The construction of certain prior art box fans is such that the rotor bearing is likely to wear unevenly, causing undesirable vibrations and noise.

The ventilating fan illustrated and described herein obviates the aforementioned disadvantages of prior art ventilating fans. For example, it has a frame that is cast as a one-piece unit, and the construction is such that the fan blade and its associated hub can be simple removed for easy access to the motor. An oil sealing system is provided by which additional lubrication during the life of the ventilating fan is unnecessary. In addition, the rotor bearings wear evenly because they rotate about a stationary shaft. The fan which forms the illustrative embodiment of the invention also utilizes a novel terminal block, which has a simplified and very effective construction.

BRIEF SUMMARY OF THE INVENTION

In accordance with the present invention, there is provided a ventilating fan comprising a frame having a bore for receiving a fan blade therein. One end of the frame comprises a centrally located member for receiving an electric motor and defines a plurality of venting openings intermediate the motor receiving member and the periphery of the frame. A central shaft extends on the axis of the bore, with one end of the shaft being fastened at the center of the motor receiving member.

The inside surface of the motor receiving member defines a sleeve for receiving a rotor. A rotor is rotatably positioned about the shaft within the sleeve, and a stator assembly is connected to the motor receiving member and surrounds the rotor. A hub member, carrying a plurality of fan blades, is fastened to the rotor.

In the illustrative embodiment, the ventilating fan frame is cast as a one-piece unit and has a generally rectangular periphery and a tapered circular bore.

The rotor of the illustrative embodiment carries a pair of spaced bearings, and has oil retaining means disposed between and in contact with the bearings. The hub member is liquid-impervious to form an oil seal and is positioned to cover the side of the rotor and stator assembly opposite the motor receiving member.

In the illustrative embodiment, a simplified terminal block is provided, which comprises an insulative member defining a pair of slots. A pair of elongated electrically conductive terminals are positioned within the slots, with an electrically conductive lead fastened to one end of each terminal on one side of the insulative member. The one end of each terminal is twisted with respect to the other end whereby the one end is in misalignment with its respective slot, in order to prevent longitudinal movement of the terminal in the direction of the other end.

A more detailed explanation of the invention is provided in the following description and claims, and is illustrated in the accompanying drawings in which:

BRIEF DESCRIPTION OF THE SEVERAL VIEWS OF THE DRAWINGS

FIG. 1 is a front view of a ventilating fan frame casting, in accordance with the principles of the present invention;

FIG. 2 is a front view of the casting of FIG. 1, with the stator assembly fastened thereto;

FIG. 5 (appearing with FIG. 1) is a side elevational view of the casting of FIG. 1, viewing the left side thereof;

DETAILED DESCRIPTION

Figure 3:
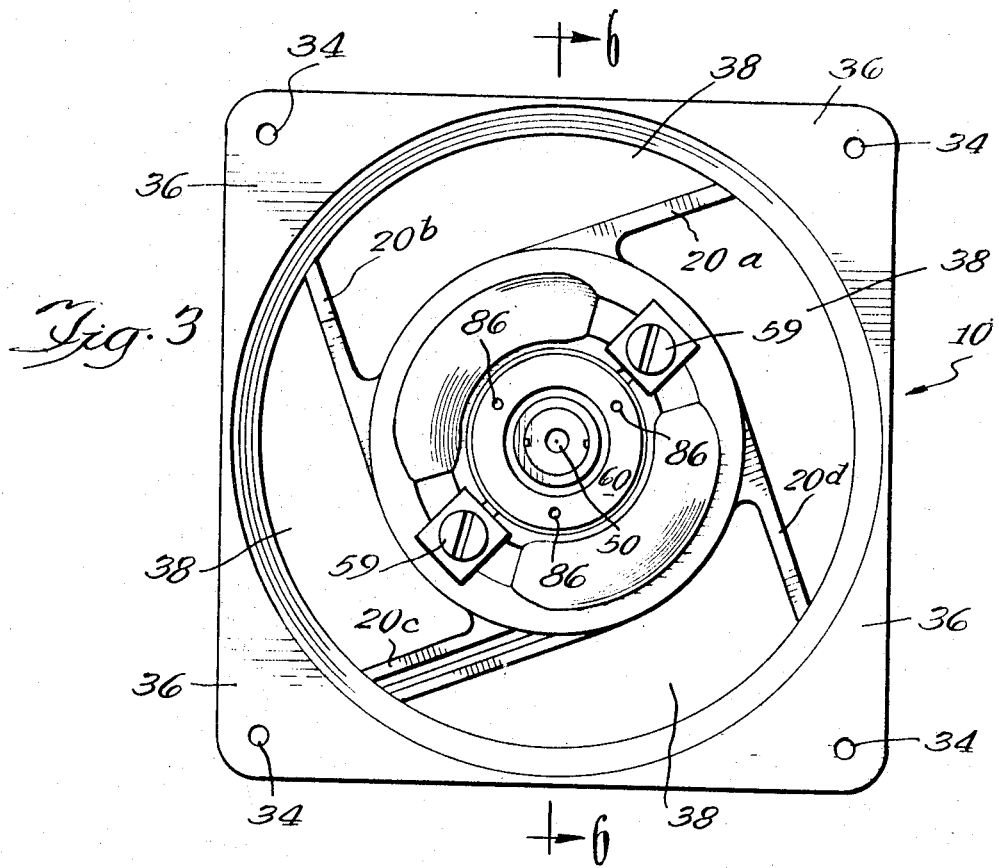
FIG. 3 is a front view of the casting of FIG. 2, with the rotor assembly positioned within the stator assembly.
Figure 4:
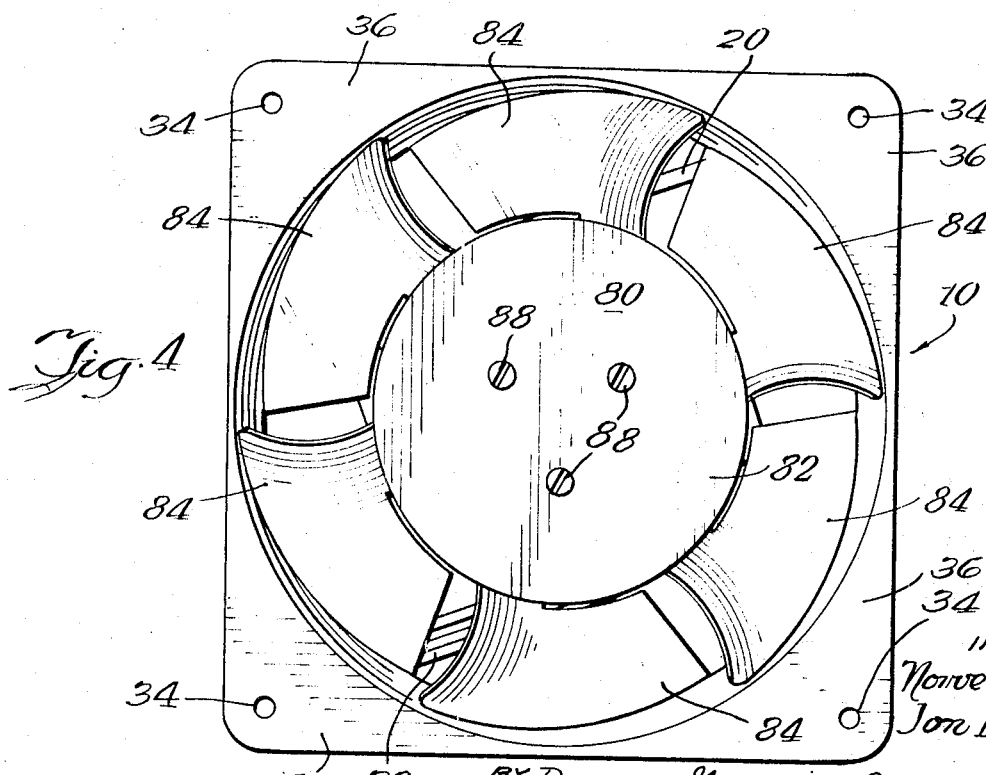
FIG. 4 is a front view of the casting of FIG. 3, with the hub and fan blades fastened to the rotor.

The ventilating fan frame 10 is formed as a one-piece casting, which comprises a generally rectangular periphery 12, a circular bore 14 which is tapered inwardly toward the rear 16 of the casting (see FIG. 6), a centrally positioned motor receiving member 18 and four spokes 20a, 20b, 20c and 20d connecting the motor receiving member 18 to the rear 16 of the frame 10. The motor receiving member 18 and the outer portions 36 of the frame define between them four ventilating spaces 38. Spoke 20c has a channel 40 for carrying the wires from the stator assembly to a terminal block 41. The terminal block construction is discussed in detail below.

Motor receiving member 18 is circular and includes an outer rim 22 and an inner ring 24 defining therebetween a trough 26 in which stator windings are positioned. A cylindrical post 28 is formed to receive a shaft at the center thereof and to define, with inner ring 24, a trough 30 therebetween to receive a rotor. A pair of rectilinear uprights 39 are cast bosses for receiving the bolts which aid in fastening the stator assembly to the frame 10 and also serves to separate the trough 26 into two areas 42 and 44 each of which areas is adapted to receive a portion of one of the two stator windings.

Four apertures 34 are provided adjacent the four corners of the frame to receive the bolts which fasten the frame to the appliance in which the fan is used.

In assembling the fan, a shaft 50 is press-fitted to cylindrical post 28. Cavities 42 and 44 are then filled with a thermosetting epoxy resin and a stator assembly 52, comprising two stator windings 54 and 56 wound upon a magnetic core 58, is placed on rotor receiving member 18 so that one side of winding 54 is positioned within channel 42 containing epoxy resin in molten state and one end of winding 56 is positioned within channel 44 also containing epoxy resin in molten state. The stator assembly 52 is held in place with clips while two bolts 59 are used to aid in fastening the assembly in place.

In addition to aiding in securing the assembly 52 to the motor receiving member 18, the thermosetting resin provides a heat sink for windings 54 and 56, as it is a better heat conductor than air.

Figure 6:
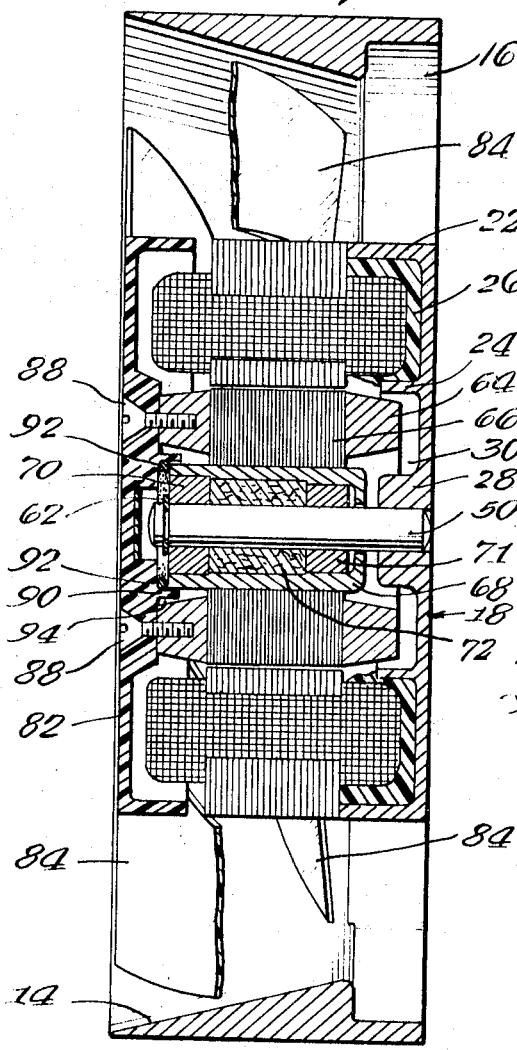
FIG. 6 is a side elevational view, taken along the lines 6—6 of FIG. 4.
Figure 8:
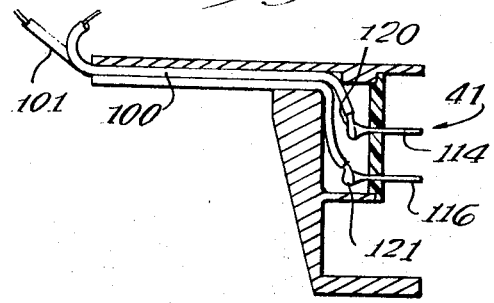
FIG. 8 is a sectional view of a terminal block taken along the line 8—8 of FIG. 7.
Figure 9:
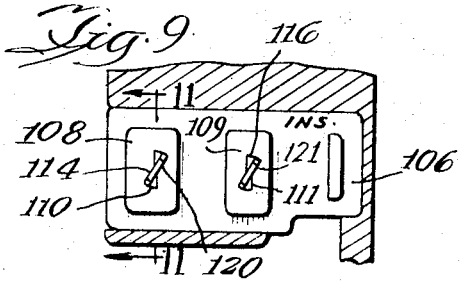
FIG. 9 is a rear view of the terminal block of FIG. 8.
Figure 10:
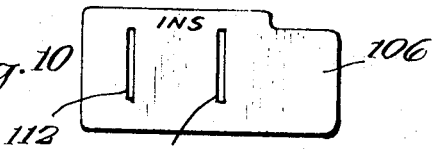
FIG. 10 is a front view of the terminal block of FIG. 8 without the terminals.
Figure 11:
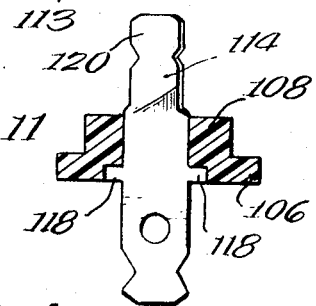
FIG. 11 is a sectional view taken along the line 11—11 of FIG. 9.
Figure 7:
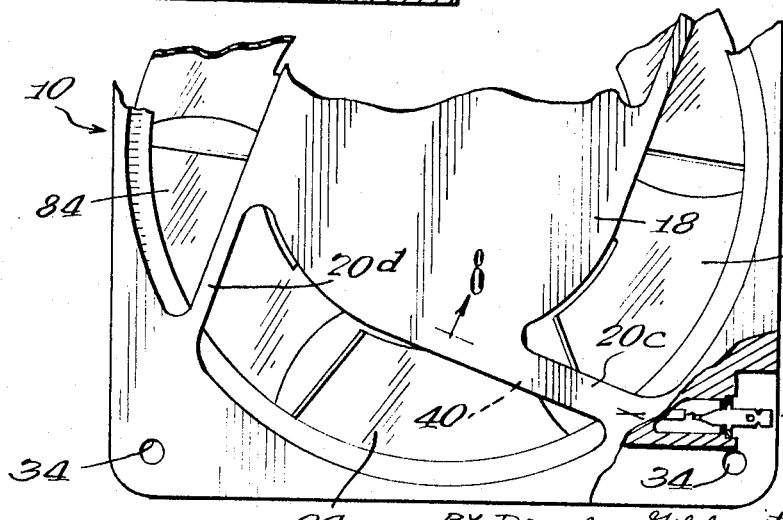
FIG. 7 is a fragmentary rear view, partially broken, of the ventilating fan of FIG. 4, showing the terminal block connection.

Referring to FIGS. 3 and 6, a rotor assembly 60 is placed on stationary shaft 50 and a retaining ring 62 is utilized to prevent the rotor from moving longitudinally with respect to the shaft 50. Rotor assembly 60 is a type disclosed in U.S. Pat. No. 2,904,709 and comprises an annular frame 64 with a core structure 66 comprising a stacked assembly of magnetic laminations. A tubular rotor housing 68 encloses a pair of spaced metal bearings 70 and 71 with an oil retaining felt ring 72 interposed between and in contact with the bearings.

The rotor assembly described herein is advantageous in that it allows more even bearing wear and it needs no lubrication after the ventilating fan is assembled. Systems in which the shaft rotates within a bearing tend to provide a large amount of bearing wear on one portion of the bearing, because, if the shaft is exerting undue pressure on one portion of the bearing, that portion will become worn and undesirable vibration might occur. In the preferred embodiment of the present invention, in which the rotor and its associated bearings rotate about the shaft, any wear due to shaft misalignment will occur evenly within the bearings. Further, the preferred embodiment utilizes oil retention between a pair of bearings to obviate the need to lubricate the motor periodically as with prior art motors.

The motor is sealed by a fan blade assembly 80 comprising a central, circular hub 82 having fan blades 84 formed about its periphery in a one-piece construction. Assembly 80 is preferably formed of a plastic material and defines apertures which align with apertures 86 in the rotor assembly so that screws 88 may be used to fasten the blade assembly 80 to the rotor assembly 60. The diameter of hub 82 is equal to the outer diameter of the stator core so that the hub covers both the stator and rotor assemblies.

As shown in FIG. 6, the inside of hub 82 has an annular ring 90 in which a rubber O-ring 92 is positioned. Ring 90 fits snugly over tubular rotor housing 68. Hub 82, annular ring 90, O-ring 92 and tubular rotor housing 68 serve as an effective oil seal for the rotor assembly.

As shown most clearly in FIGS. 7-11, leads 100 and 101 from the stator windings are located within channel 40 of spoke 20c and extend to terminal block 41. Terminal block 41 comprises a plastic member 106 having a pair of rectilinear upright portions 108 and 109 formed thereon. Upright portions 108 and 109 define slots 110 and 111, respectively, which are contiguous with but not as elongated as slots 112 and 113, respectively, defined by the other portion of the plastic member.

A metal terminal 114 is located within slots 110, 112 and a metal terminal 116 is located within slots 111, 113. The terminals are each provided with two perpendicular fingers 118 which, when the terminals are inserted in the slots from the front of the plastic member, prevent the terminals from moving rearwardly. In order to prevent the terminals from moving forwardly, the rear ends 120, 121 of the terminals 114 and 116, respectively, are twisted 45°, as shown most clearly in FIG. 9.

Lead 100 is soldered to the end 120 of terminal 114 and lead 101 is soldered to the end 121 of terminal 116. It is preferred that the plastic material used for member 106 be such that the member is resilient enough to be press-fitted into an appropriate opening defined by the ventilating fan frame 10. Nylon has been found satisfactory for this purpose. The economy and ease of construction of the terminal block disclosed herein are apparent.

Although a preferred embodiment of the invention has been described and illustrated, it is to be understood that various substitutions and modifications may be made by those skilled in the art without departing from the novel spirit and scope of the present invention.

We claim

1. A ventilating fan, which comprises: a frame having a generally rectangular periphery and a circular bore for receiving a fan blade therein, one end of said frame comprising centrally located means for receiving an electric motor and defining a plurality of venting openings intermediate said motor receiving means and said periphery; a central shaft extending on the axis of said bore, one end of said shaft being fastened at the center of said motor receiving means, the inside surface of said motor receiving means defining a sleeve for receiving a rotor; a rotor rotatably positioned about said shaft and within said sleeve; a stator assembly connected to said motor receiving means and surrounding said rotor, said stator assembly having a plurality of stator windings a portion of which are embedded in a thermosetting composition contained by said motor receiving means; a hub member carrying a plurality of fan blades; and means for fastening said hub member to said rotor.

2. A ventilating fan as described in claim 11, wherein said rotor carries a pair of spaced bearings, and further including oil retaining means disposed between and in contact with said bearings.

3. A ventilating fan as described in claim 1, wherein said hub member is liquid-impervious to form an oil seal and is positioned to cover the side of said rotor and stator assembly opposite said motor receiving means.

4. A ventilating fan which comprises: a frame having a bore for receiving a fan blade therein, one end of said frame comprising centrally located means for receiving an electric motor and defining a plurality of venting openings, the inside surface of said motor receiving means defining a sleeve for receiving a rotor; a stationary central shaft extending on the axis of said bore, one end of said shaft being fastened to the center of said motor receiving means; bearing and oil retaining means in contact with and rotatable about said stationary shaft; a tubular rotor housing enclosing said bearing and oil retaining means; a rotor mounted on said tubular rotor housing and rotatably positioned about said stationary shaft and within said sleeve; a stator assembly having a plurality of stator windings at least a portion of which are embedded in a thermosetting composition contained by said motor receiving means and surrounding said rotor; a hub member carrying a plurality of fan blades, said hub member being liquid-impervious and being positioned to cover the end of said rotor and the end of said stator assembly opposite said motor receiving means and positioned in contact with said opposite end of said rotor; sealing means disposed between and in engagement with said hub member and the end of said tubular rotor housing opposite said motor receiving means to form an oil seal therebetween; and means for detachably fastening said hub member to said opposite end of said rotor.

5. A ventilating fan as described in claim 4 wherein said opposite end of said rotor and said opposite end of said tubular housing define an annular groove therebetween, and said hub member has an annular ring located within said groove.

6. A ventilating fan as described in claim 5 wherein said sealing means includes a resilient O-ring positioned on the end of said hub member within said annular ring for aiding in sealing the hub member and rotor.

7. A ventilating fan as described in claim 4 wherein said bearing and oil retaining means includes a pair of spaced bearings and oil retaining means disposed between and in contact with said bearings.

8. A ventilating fan as described in claim 4, said means for fastening said hub member to said rotor comprising screws which, when removed, permit the hub member to be pulled axially without external obstruction.

9. A ventilating fan as described in claim 4, said hub member comprising a one-piece unit and defining a plurality of apertures for receiving said fastening means.

10. A ventilating fan as described in claim 4, said frame comprising a one-piece member having a generally rectangular periphery and a circular bore.

11. A ventilating fan, which comprises: a frame having a bore for receiving a fan blade therein, one end of said frame comprising centrally located means for receiving an electric motor and defining a plurality of venting openings, the inside surface of said motor receiving means defining a sleeve for receiving a rotor; a stationary central shaft extending on the axis of said bore, one end of said shaft being fastened to the center of said motor receiving means; a rotor rotatably positioned about said stationary shaft and within said sleeve; a stator assembly connected to said motor receiving means and surrounding said rotor; a hub member carrying a plurality of fan blades, said hub member being liquid-impervious to form an oil seal and being positioned to cover the side of said rotor and stator assembly opposite said motor receiving means; and means for fastening said hub member to said rotor, wherein the inside of said motor receiving means comprises a flange concentric with said sleeve forming a trough between said flange and sleeve; said trough receiving a portion of the windings of said stator assembly and containing a thermosetting material to provide a heat conductive path and to aid in securing said stator assembly to said motor receiving means.

12. A ventilating fan, which comprises: a frame having a generally rectangular periphery and a circular bore for receiving a fan blade therein, one end of said frame comprising centrally located means for receiving an electric motor and defining a plurality of venting openings intermediate said motor receiving means and said periphery; a stationary central shaft extending on the axis of said bore, one end of said shaft being fastened at the center of said motor receiving means, the inside surface of said motor receiving means defining a sleeve for receiving a rotor; bearing and oil retaining means in contact with the rotatable about said stationary shaft; a tubular rotor housing enclosing said bearing and oil retaining means; a rotor mounted on said tubular housing and rotatably positioned about said stationary shaft and within said sleeve; a stator assembly having a plurality of stator windings at least a portion of which are embedded in a thermosetting composition contained by said motor receiving means and surrounding said rotor; a hub member carrying a plurality of fan blades, said hub member being liquid-impervious and being positioned to cover the end of said rotor and the end of said stator assembly opposite said motor receiving means and positioned in contact with said opposite end of said rotor; said opposite end of said rotor and said opposite end of said tubular housing defining an annular groove and the inside of said hub member having an annular ring located within said grove; a resilient O-ring positioned on said hub member within said annular ring for aiding in sealing the hub member and rotor; said hub member comprising a one-piece unit, said hub member and said rotor defining apertures for receiving fastening means for detachably fastening said hub member to said opposite end of said rotor, said fastening means comprising screws which, when removed, permit the hub member to be pulled axially without external obstruction.

* * * * *